United States Patent [19]

Nette

[11] 4,398,675
[45] Aug. 16, 1983

[54] OSCILLATORY MILL

[76] Inventor: Friedrich W. Nette, Sachsenstrasse 26, 4030 Ratingen 6 (Hösel), Fed. Rep. of Germany

[21] Appl. No.: 252,134

[22] Filed: Apr. 8, 1981

[30] Foreign Application Priority Data

Apr. 11, 1980 [DE] Fed. Rep. of Germany ....... 3013987

[51] Int. Cl.³ ............................................. B02C 13/26
[52] U.S. Cl. ................................ 241/188 R; 241/264; 241/283; 241/285 R
[58] Field of Search ............ 241/285 R, 285 A, 186.2, 241/188 R, 187, 195, 264, 148, 283

[56] References Cited

U.S. PATENT DOCUMENTS 413,898 10/1889 Blanchard ........................ 241/148 X
2,539,775 1/1951 Gordon ........................... 241/188 R

FOREIGN PATENT DOCUMENTS 2547008 5/1976 Fed. Rep. of Germany ... 241/188 R
2500233 3/1977 Fed. Rep. of Germany .
534247 2/1977 U.S.S.R. ............................. 241/264

Primary Examiner—Mark Rosenbaum
Attorney, Agent, or Firm—Michael J. Striker

[57] ABSTRACT

An oscillatory mill has at least one oscillatable container having at least one comminution zone, a housing arranged in the comminution zone, a hammer bar associated with an anvil bar and mounted on a spring element resting on a fixed abutment, wherein the housing together with the hammer bar, anvil bar, spring element and abutment together form a block which is mounted exchangeable in the container.

33 Claims, 5 Drawing Figures

OSCILLATORY MILL

BACKGROUND OF THE INVENTION

The present invention relates to an oscillatory mill. More particularly, it relates to an oscillatory mill which has at least one oscillatable container with at least one comminution zone in which at least one grinding member formed as a hammer bar is mounted so as to oscillate freely and substantially in a straight line toward the impact surfaces of the anvil bars, wherein the hammer bar is oscillatably mounted only by means of a spring element resting on a fixed abutment.

Oscillatory mills of the above-mentioned type are known in the art, for example from the German Pat. No. 2,500,233 of the present inventor. The oscillatory mill of that construction has many disadvantages which are described in that patent. If any repairs or the like are required, the individual hammer and anvil bars and other parts of the mill have to be dismantled separately and replaced individually, if necessary. Under certain circumstances, this results in long periods of installation and dismantling, involving correspondingly long periods when the oscillatory mill is out of action, thus making it desirable to remedy this, though the basic operation of the oscillatory mill has proven exceptionally advantageous.

SUMMARY OF THE INVENTION

Accordingly, it is an object of the present invention to provide an oscillatory mill with which the installation and dismantling of hammer and anvil bars or the like is considerably simplified. As a result, the periods of shutdown of such oscillatory mills should be reduced considerably.

It is also an object of the present invention to provide such a construction of the oscillatory mill that any maintenance work required can also be carried out without difficulty.

In keeping with these objects, and with others which will become apparent hereafter, one feature of the present invention resides, briefly stated, in an oscillatory mill in which a hammer bar, an anvil bar with which the hammer bar cooperates, a spring element and an abutment of the latter form together with a housing a block which is mounted replaceable as a whole in a container of the mill.

Owing to the fact that the anvil and hammer bars and other components are combined to form a functional unit, i.e., a replaceable or exchangeable block, these blocks can be kept in readiness in the warehouse, ready for operation, so that if required they can be used to replace any exchangeable blocks which are defective and/or in need of an overhaul. As a result, there are only short periods of shutdown, since exchangeable blocks of this kind can be removed from the oscillatory mill as an entire unit (e.g. using a fork-lift truck) and can be replaced. The oscillatory mill is therefore ready to be used again after a short period of shutdown. The exchangeable block taken from the oscillatory mill can then be transported to an appropriate workshop and there be dismantled and overhauled.

Depending on the size of the oscillatory mill used and the conditions of use, it may be appropriate to combine all the grinding tools (e.g. all the grinding tools on one side of a directional exciter) to form an exchangeable block, or a number of exchangeable blocks of this kind are mounted side by side and/or one above the other on one side or on several sides of a directional exciter in a suitable support structure. In this way, the exchangeable blocks can be kept relatively small and also relatively light.

Another advantage of the invention is that exchangeable blocks having hammer bars of different sizes and/or different weights can be kept in stock so that these exchangeable blocks can be fitted depending on the material which is to be ground.

In addition, exchangeable blocks with different size gap widths between the impact surfaces of the hammer bars and anvil bars can be kept in stock so that the mill can be adapted to the particular material to be ground. Finally, according to the invention, it is also possible to remove the exchangeable blocks in question, in their entirety, when a predetermined gap width has been exceeded, and replace them with other exchangeable blocks kept in readiness, wherein the gap width between the impact surfaces of the anvil and hammer bars is the correct one.

It is even possible to vary the number of impact members, i.e. predominantly the hammer bars, within the individual exchangeable blocks, so that, depending on the material to be ground, exchangeable blocks with a greater or smaller number of hammer bars can be used. Moreover, the mill can readily be constructed so that the number of comminution zones provided inside an exchangeable block can be varied by using different exchangeable blocks. In this way the throughput and/or final particle size of the ground material, for example, can also be influenced.

The exchangeable block may extend, in the vertical direction, over all the comminution zones. Consequently, there is no need to arrange a plurality of exchangeable blocks one above the other and as a result the arrangement for mounting the exchangeable blocks inside the mill is simplified. Furthermore, this saves additional adjusting work.

Advantageously, each exchangeable block may extend in width over a plurality of rows of hammer bars arranged side by side. In this way, any desired number of exchangeable blocks can be provided side by side, so that oscillatory mills of any capacity can be fitted with exchangeable blocks of this kind. Since the exchangeable blocks do not extend over the entire width of the mill, i.e. over all the hammer bars located side by side in one comminution zone, exchangeable blocks are obtained which can still readily be transported, e.g. by means of a fork-lift truck, and installed and removed.

The exchangeable blocks may be clamped between releasable and adjustable thrust bearings. In this case they can be arranged relatively quickly, but in an extremely robust manner, in the structure of the oscillatory mill.

Each exchangeable block may have outwardly projecting pressure strips, and the thrust bearing abut against the latter. In such a construction, in addition to transmitting the reaction forces over a large area, clamping of any desired number of exchangeable blocks inside the support structure of the oscillatory mill is provided.

A particularly advantageous embodiment is when the exchangeable block or blocks is or are encircled by a suitable support structure or container provided with feeding and discharging means. This makes it possible, for example, to arrange virtually any desired number of exchangeable blocks on each side of a directional exciter or a plurality of such exciters inside annular support structures of this kind, giving an attractive closed-off external appearance together with relatively small dimensions. Moreover, this compact construction makes it relatively easy to sound-proof the oscillatory mill.

The same number of the exchangeable block may be arranged at each side of a directional exciter. This will presumably be preferred for practical use, since the symmetry of the oscillatory mill permits a particularly advantageous transmission of the forces from the directional exciter and good control of the reaction forces.

The walls of the housing of the exchangeable block may be braced against one another by tie rods. Such a mill can be constructed using simple means.

The side walls of the blocks may be composed of a plurality of wall portions, whereby the each block is sealed off from the outside in dust-tight manner but the walls can still be dismantled into individual components to enable them to be maintained and/or replaced if necessary. Owing to the fact that the wall portions fit into each other in positively locking manner, these parts merely have to be pressed together using the tie rods. No other screw fixings for these individual parts are required since the parts are held in place in dust-tight manner solely by the engagement of the above-mentioned wall portions.

In accordance with a particularly advantageous embodiment, the wall portions of the exchangeable blocks extending parallel to the direction of impact of the hammer bars consist of strips or bars which are pressed against one another in a dust-tight position by means of the tie rods.

These wall portions in the form of strips or bars also form the bearings for the anvil bars which are firmly but releasably connected to the strips in question by means of suitable projections or the like at their ends.

An embodiment which is particularly advantageous for practical use is the one wherein strips for compensating play are provided between the strip-like wall portions. The advantage of this is that, after the impact surfaces of the anvil and/or hammer bars have suffered a certain amount of wear, these parts no longer have to be replaced in their entirety. Instead, it may be sufficient to install other strips for compensating play, so as to obtain the gap width between the impact surfaces of the anvil and hammer bars which is required in practice.

The strips for compensating play in the oscillating direction of hammer bars may be of the same thickness, but strips of different thickness may be provided.

The entire oscillatory mill may be provided with sound-proofing which is fitted with sound-proofing doors solely for the purpose of installing and removing the exchangeable blocks.

The spring elements may consist of rubber or plastic blocks in which at least one metal coil spring is embedded or vulcanized. This results in the advantage that the individual turns of the metallic coil spring are supported on all sides, during deformation, by the surrounding material in which the coil spring is embedded. First of all, this ensures that only moderate stress is exerted on the metallic coil springs. Furthermore, the rubber or plastics blocks themselves act like springs.

Another important advantage of this solution is the fact that no foreign substances, e.g. material for grinding, can get between the turns of the coil springs, which might cause detrimental stress on the coil springs, e.g. resulting in indentation or load peaks. Consequently, the service life of the springs, particularly the metal coil springs, is lengthened considerably.

Moreover, the rubber or plastics blocks themselves may act as abutment elements for the hammer bars, thus eliminating the need for spring elements on the upper side of the hammer bars. This does away with half of the spring elements hitherto required, which is not only a financial saving but also has the additional advantage that the spring elements required hitherto on the top of the hammer bars can no longer restrict the flow of material for grinding. Since the spring elements are now mounted below the hammer bars, they are protected to some extent, being located in the "shadow" of these hammer bars, and are no longer subject to the detrimental action of abrasive mineral materials even during long-term operation.

The spring elements may decrease in diameter from their ends toward their centers and thereby counteract stress on the spring elements. Moreover, there is the additional advantage that the discharge of heat is promoted, since the shape of the external surface of the spring elements can be designed not only according to the actual stress conditions but also according to the development of heat occurring as a result of the compression.

A particularly stable structure is obtained when each of the spring elements have a bolt passing centrally through them, this bolt having, for example, screw threads at its ends. In this way, the spring elements can be firmly but releasably mounted at both ends, e.g. at one end they may be firmly joined to the hammer bar through which they may pass, for example, whilst the other end of the bolt is screwed to the abutment.

Each hammer bar may be supported only at its lower side by two spring elements. The abutment for the spring elements may be formed by a strip-shaped sheet metal member which is releasably attached to the side walls of an exchangeable block. Sheet metal abutments of this kind can easily be suitably formed, e.g. with deflector lugs which favorably deflect the stream of material for grinding downwards. Moreover, suitable bearing points for the spring elements may also be formed thereon, e.g. recesses or corrugations corresponding to the spring elements. Not only does this make the elements easier to assemble but also gives a firm fit which is free from vibration.

The abutment may have an upper roof-shaped portion and downwardly bent side portions.

The novel features which are considered characteristic for the invention are set forth in particular in the appended claims. The invention itself, however, both as to its construction and its method of operation, together with additional objects and advantages thereof, will be best understood from the following description of specific embodiments, when read in connection with the accompanying drawing.

DESCRIPTION OF THE PREFERRED EMBODIMENTS

Figure 1:
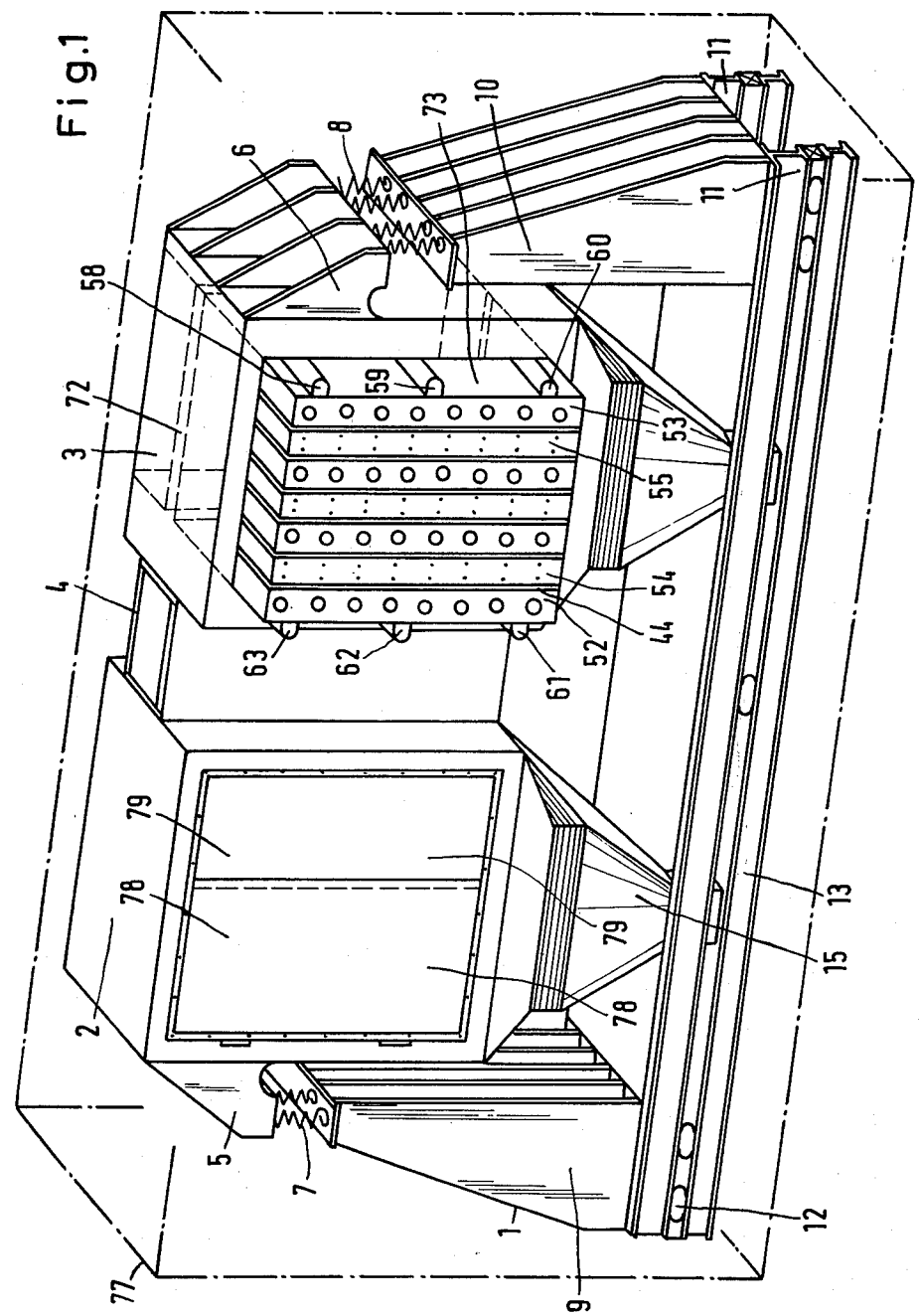
FIG. 1 shows an oscillatory mill viewed in perspective, partly open at one end.

Reference numeral 1 denotes the frame of an oscillatory mill which, in the embodiment shown, comprises two containers 2 and 3 of substantially rectangular cross section. The two containers 2 and 3 are joined by means of a thick-walled tube 4. The walls of the containers 2 and 3 are braced against one oather by tie rods 300. In addition, the containers 2 and 3 are mounted, via support straps 5 and 6 with interposed resilient spring elements 7 and 8, on brackets 9 and 10 of the frame 1, these brackets in turn resting on steel carriers 11 and being fixedly connected thereto. The steel carriers 11 are mounted on base supports 13, via a plurality of vibration absorbing elements 12, so that virtually no vibrations proceeding from the mill are transmitted to the floor. Consequently, the base and the building cannot be affected by harmful vibrations.

Figure 2:
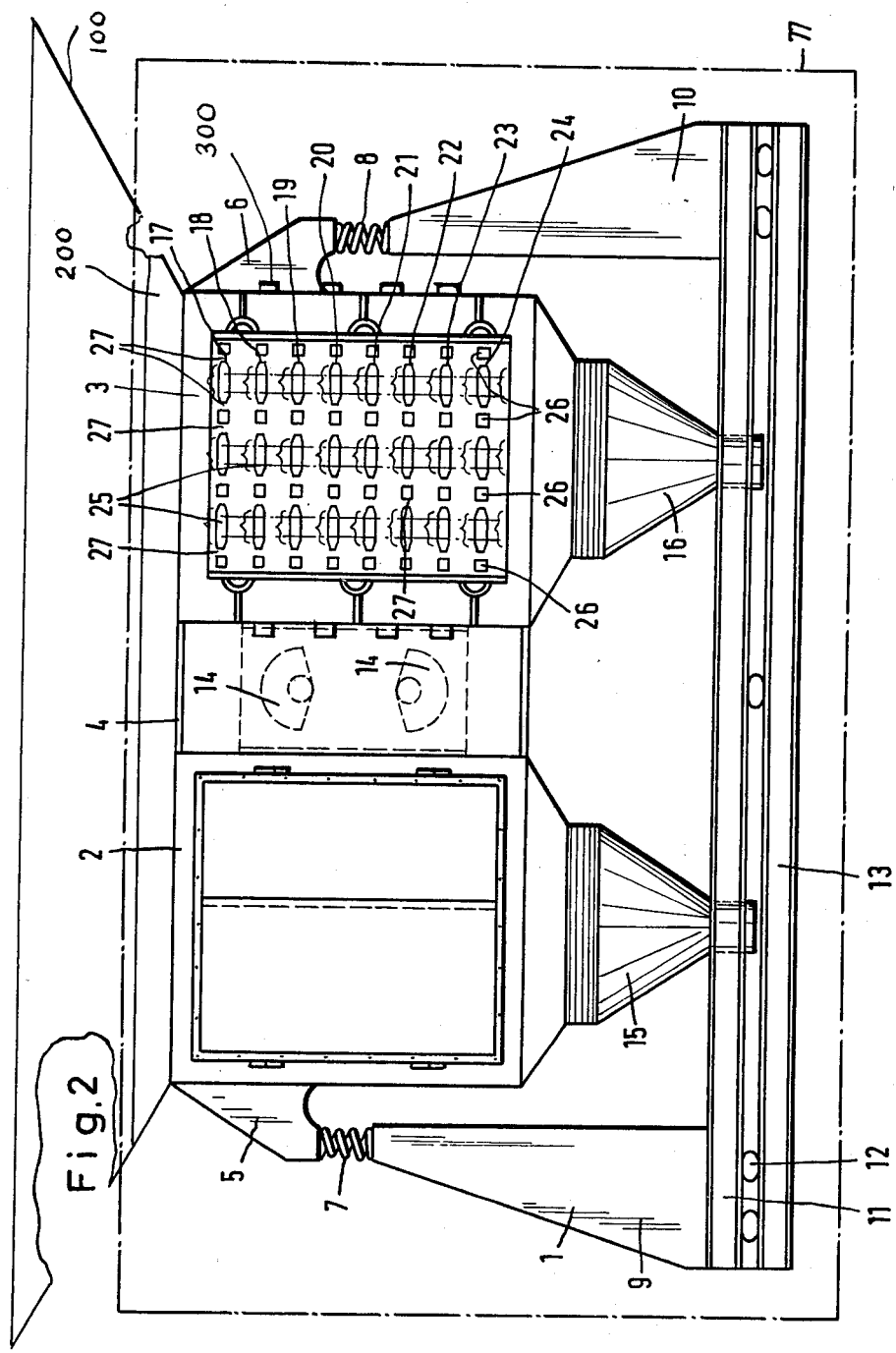
FIG. 2 is a side view of the oscillatory mill shown in FIG. 1, viewed in partial longitudinal section.

Mounted between the containers 2 and 3 is a suitable motor-driven directional exciter 14 with flywheel masses, by means of which the containers 2 and 3 can be set oscillating simultaneously and synchronously (FIG. 2). The directional exciter 14 also serves to connect the containers 2 and 3. For this purpose, the directional exciter has flange-like projections on the two diametrically opposite sides, which are connected to the containers 2 and 3 by means of screws or the like. If the directional exciter 14 is not provided, the containers 2 and 3 are separate.

In the embodiment shown, the longitudinal axes of the containers 2 and 3 extend in the vertical direction and parallel to each other so that the material for grinding (not shown) which is fed in at the top of the containers 2 and 3 (e.g. by means of a suitable feed and/or metering device) passes to the outlet funnels 15 and 16 of the containers under the effect of gravity. However, there is no reason why one common outlet funnel should not be associated with all the containers 2 and 3 and/or why there should not be a greater or smaller number of containers. The feed and/or meter device associated with the filling funnel or the filling funnels 100 may have at least one compartmentalized wheel 200 or the like which distributes the material to be ground to the individual containers, e.g. containers 2 and 3. Finally, the arrangement may also be such that material for grinding of different types and/or having different particle sizes is ground in the various containers. It is also possible to grind different materials in the individual containers, e.g. in the containers 2 and 3.

As shown in FIG. 2, in particular, a plurality of comminution zones, in this embodiment eight comminution zones 17, 18, 19, 20, 21, 22, 23 and 24, are arranged vertically of the containers 2 and 3, at a vertical spacing from one another and extend parallel to one another. The comminution zones 17 to 24 have comminution tools (grinding tools) which, in the embodiment shown, consist of a plurality of hammer bars 25 and anvil bars 26 associated therewith.

Figure 5:
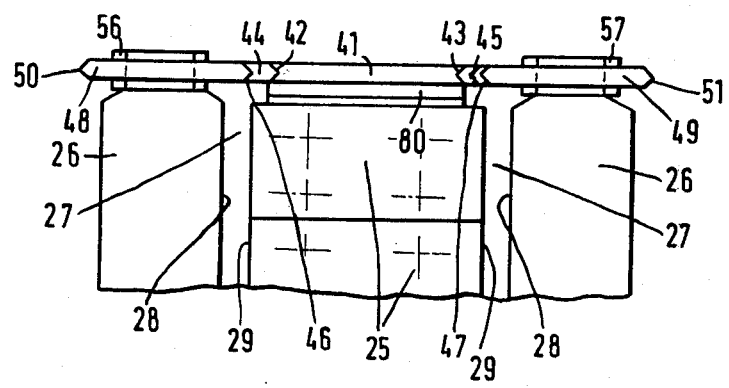
FIG. 5 is a partial cross section on the line V—V of FIG. 4.

FIG. 5 clearly shows that, in each of the comminution zones 17 to 24, several such hammer bars 25 are arranged parallel to one another and at a spacing from one another in a side by side arrangement, so that the individual hammer bars 25 can move independently of one another in the manner to be described hereinafter.

FIG. 2 also shows that, in each comminution zone 17 to 24, several (in this embodiment 3) such rows of hammer bars 25 are also mounted in the same horizontal plane at a spacing from one another and one behind the other. An anvil bar 26 is mounted between the individual rows of hammer bars 25 behind one another in such a way that a gap (grinding gap) is left on each side of each hammer bar 25 or each row of hammer bars 25, between the anvil bars 26 and the hammer bars 25. It is important to maintain an optimum width for the gap 27, depending on the amplitude of the hammer bars 25 and on the material which is to be ground. The width of the gap 27 can thus be adjusted to suit the particular requirements, and, in the embodiment shown, this is done in the manner described hereinafter.

FIG. 5 also shows that the anvil bars 26 each extend at right angles to the associated containers 2 and 3 and are prevented from rotating. Each anvil bar 26 extends over the entire width of a row of hammer bars 25 located side by side (FIG. 5) in the exchangeable block which will be described hereinafter.

In the embodiment shown in the drawing, the hammer bars 25—and the anvil bars 26—are made of steel, more particularly hardened steel or cast steel. The hammer bars 25 may be tapered so as to converge conically outwards at their edges facing the anvil bars 26.

On their impact surfaces 29 facing the anvil surfaces 28 which act as impact surfaces, the hammer bars 25 and the corresponding anvil surfaces 28 have a high quality machine finish, produced by grinding, for example, so that the impact surfaces 29 of the hammer bars 25 can be brought into full contact with the entire area of the corresponding anvil surfaces or impact surfaces 28 of the anvil bars 26.

The anvil bars 26 may also be tapered at least at the top edges of their upper surface facing the tapered edges of the hammer bars 25, so that the tapered portions of the hammer bars 25 and the anvil bars 26 extend at substantially the same level. This ensures that the material for grinding fed in at the top of the oscillatory mill is easily guided into the gaps 27.

Each hammer bar 25 is mounted so as to oscillate freely in the direction of its longitudinal axis 32, i.e. in the X or Y direction, by means of two spring elements 30, 31 extending at a spacing on its underside and with their longitudinal axes extending parallel to each other. The spring elements 30 and 31 in the embodiment shown are made of a suitable polymeric plastics material having resilient properties, e.g. a suitable polyurethane or polyamide with rubber-like properties. The material used is resistant to ozone, light, oils, grease and the material which is to be ground and has the required abrasive resistance and wear resistance.

Figure 4:
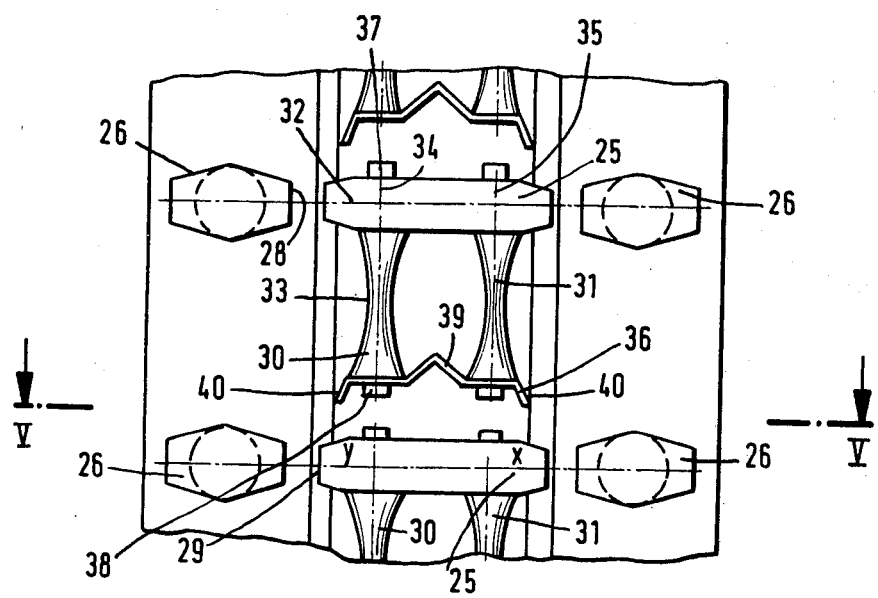
FIG. 4 is a cut away view, in longitudinal section, of an exchangeable block.

FIG. 4, in particular, clearly shows that the spring elements 30 and 31 are constricted (tapered) in the central longitudinal portion. Appropriately, the outer surface 33 will be designed so as to give a favorable path for the lines of force inside the spring elements.

In the embodiment shown, metal coil springs (not shown) extend inside the spring elements 30 and 31, said coil springs being totally enclosed by the materials of the spring elements 30 and 31, so that the metal coil springs, e.g. metal tension springs, are completely embedded, i.e. vulcanized into the material. Bolts 34 and 35 (shown only schematically) pass centrally through the spring elements 30 and 31 and hence also through the centers of the coil springs (not shown) and at both ends of the spring elements 30 and 31 these bolts 34 and 35 project out of the spring elements to such an extent that one end portion passes through the hammer bars 25 while the other end portion passes through a strip-shaped abutment 36 consisting of a sheet metal member which is bent at an angle. Both ends of each bolt 34, 35 are releasably screwed, e.g. by means of nuts 37 and 38, so that the spring elements 30 and 31 are mounted between the abutment 36, on the one hand, and between the associated hammer bar 25, on the other hand. Thus, each hammer bar 25 is associated with a pair of spring elements 30 and 31 of this kind.

As can be seen from FIG. 4, the abutment 36 is formed so as to converge upwardly, in a roof-like configuration, in its center (at 39), while the side edges 40 at both sides are bent downwards. The abutment 36 extends at right angles to the longitudinal axes 32 of all the hammer bars 25 arranged in the particular comminution zone 17 to 24, and at both ends this abutment 36 extends somewhat over the associated row of hammer bars of each comminution zone 17 to 24 (FIG. 5).

All the abutments 36 are firmly but releasably connected to vertically extending strip-shaped wall portions at their end regions on both sides; FIG. 5 shows only the strip portion 41 thereof. The wall portion diametrically opposite this wall portion 41 is of similar construction. This wall portion 41, in the section shown in FIG. 5 and taken parallel to the surface of the hammer bars, is provided with roof-shaped depressions 42 and 43 facing each other. Similarly shaped play-compensating strips 44 and 45 of the different thickness fit into these depressions 42 and 43, these strips 44 and 45 also having a roof-shaped depression on their narrow side (at 46 and 47) diametrically opposite the depression 42 or 43, with suitably shaped strip-shaped wall portions 48 and 49 of the same thickness engaging in said depression. These strip-shaped wall portions 48 and 49 are pointed in a roof shape at 50 and 51 to enable other wall portions, e.g. the wall portions 52 and 53 (FIG. 1) to engage therein. The wall portions located diametrically opposite one another are constructed accordingly. All the wall portions engaging in one another are shaped to fit the associated wall portions so as to produce a dust-tight fit. The wall portions 48 and 49 and the wall portions 54 and 55 diametrically opposite these wall portions, not shown in FIG. 5 but shown in FIG. 1, are firmly but releasably mounted on bearing elements, of which bearing elements 56 and 57 are shown in FIG. 5. These bearing elements enable the wall portions 48 and 49 and the corresponding opposite strip-shaped wall portions to be mounted in non-rotational manner.

Associated with the outer strip-shaped wall portions 52 and 53, on each side thereof, in the embodiments shown in FIG. 1, are three pressure strips 58, 59, 60 or 61, 62 and 63 which project outwards and extend at a spacing from one another and parallel to one another at different heights, these pressure strips, like all the other parts, being made of a metal material, more particularly steel.

Figure 3:
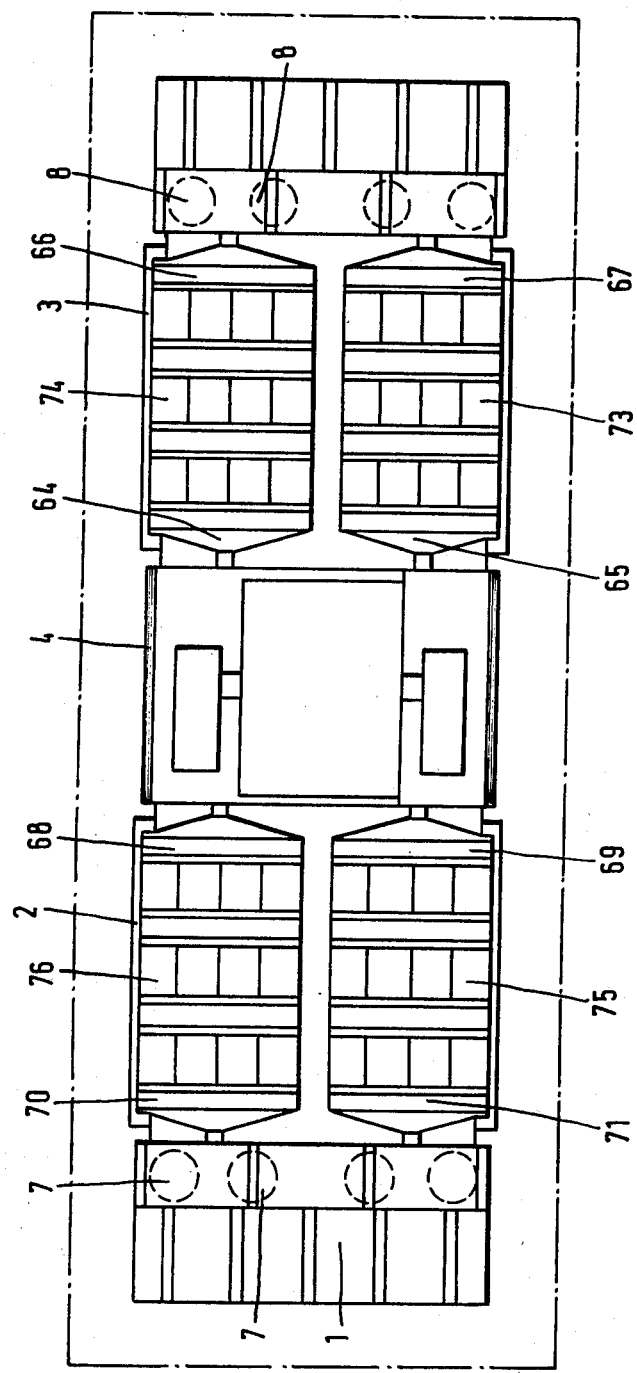
FIG. 3 is a plan view of FIG. 1 or 2, partly in section.

Thrust bearings, of which only the thrust bearings 64 to 71 are shown in FIG. 3, are adapted in shape to these pressure strips 58 to 63 and act upon them. These thrust bearing 64 to 71 are associated with adjustment spindles so that the thrust bearings 64 to 71 and others can be adjusted at a greater or lesser width in relation to the pressure strips 58 to 63. Obviously, these spindles may also be replaced by suitable hydraulic adjustment means, more particularly piston-cylinder units acted upon alternately on both sides by a suitable hydraulic fluid.

Reference numeral 72 designates an annular reinforcement 72. Several such annular reinforcements 72 may be provided on each side of the directional exciter 14; this is not shown in the drawings.

Furthermore, FIGS. 1 and 3 clearly show that the strip- or bar-shaped wall portions and numerous hammer and anvil bars 25, 26 together with their associated spring elements 30, 31 and abutments are combined to form exchangeable blocks, FIG. 1 showing the exchangeable block 73 in a position in which it is partly removed from the annular support structure, while FIG. 3 shows two exchangeable blocks 73, 74 and 75, 76 respectively, on each side of the steel structure 4 and hence the directional exciter 14, all these exchangeable blocks being constructed and assembled as described hereinbefore with reference to the drawings. Thus, blocks are obtained in the form of packets which can be removed from the structure, for example by means of a forklift truck, and be replaced by other exchangeable blocks.

The entire mill is provided with sound-proofing which is shown purely schematically and is designated by reference numeral 77. This sound insulation has double doors, e.g. on opposite sides, corresponding to the doors 78 and 79 for the support structure for the containers 2 and 3. If the doors 78 and 79 are opened, the exchangeable blocks can be removed from the support structure at the side in question. The doors in the sound insulation are mounted at the same height and preferably have the same dimensions as the doors 78 and 79. In the embodiment shown, doors of this kind are also provided on the diametrically opposite side which is not visible in FIG. 1, so that the exchangeable blocks or block provided on this side can also be removed. Moreover, the screwing or mounting of the individual hammer bars and anvil bars and abutments 36 and the individual vertical wall portions and the play-compensating strips 44, etc., are clearly shown by dots and circles on the right-hand side of FIG. 1. Reference numeral 80 denotes a lateral guide strip which is made from the same material as the hammer bars and serves to guide the hammer bars mounted at this point.

When the directional exciter is operated, the containers 2 and 3 oscillate. These oscillations are also transmitted to the hammer bars 25, thus causing them to oscillate in the direction X-Y and the grinding material fed in is crushed on the impact surfaces 28, 29 until the desired final particle size is obtained.

The spring elements 30 and 31 will generally be given a characteristic such that their natural frequency will not result in resonance, i.e. a frequency which is synchronous with the oscillations of the mill housing, under the operating conditions, in order to prevent deviation of the hammer bars 25 or standstill when the mill is operated.

An oscillatory mill according to the invention can be used for grinding, for example, cement clinker, limestone, fire clay, corundum, sillimanite, bauxite, quartzite, abrasives, colored ores, chemical and many other substances. The particles size of the product fed in may vary, for example up to about 25 millimeters. The final particle size after grinding is generally determined by the material fed in and the amount fed in. The through-flow rate remains constant with any one product. If the material to be ground is fed in through compartmentalized wheel locks, the variable speed gearing of which ensures accurate metering, the operator of the mill can control the range of desired final particle sizes within certain limits.

The desired final particle size of the product can also be varied by the number of comminution zones arranged vertically below one another in the oscillatory mill, while the throughput quantity, as mentioned above, can be determined particularly by the number of hammer bars provided side by side.

Moreover, an oscillatory mill according to the invention can be constructed so that, if large quantities of product are regularly obtained, a plurality of apparatuses may be arranged in a star configuration, in parallel or (preferably for very fine grinding) in series.

Any wear on the hammer and/or anvil bars can be compensated by readjusting the grinding gap, by means of different play-compensating strips.

Thanks to its closed system and a dust removal means which may possibly be connected thereto, an oscillatory mill according to the invention operates with virtually no release of dust.

By comparison with tube mills of corresponding capacity, the capital costs are relatively low and the drive power required is noticeably reduced. With the system of units proposed, manufacturing firms can produce exchangeable blocks ready for use and can accept used exchangeable blocks in need of mainteance or repair in part payment or for repair, while the mill operator can carry on operating the mill with the replaceable blocks provided by the manufacturer.

It will be understood that each of the elements described above, or two or more together, may also find a useful application in other types of constructions differing from the types described above.

While the invention has been illustrated and described as embodied in an oscillatory mill, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications, without omitting features that, from the standpoint of prior art, fairly constitute essential characteristics of the generic or specific aspects of this invention.

What is claimed as new and desired to be protected by Letters Patent is set forth in the appended claims:

1. An oscillatory mill, comprising at least one oscillatable container having at least one comminution zone; a housing arranged in said one comminution zone; at least one grinding member arranged in said housing and thereby in said one comminution zone and formed as an oscillatable hammer bar; at least one anvil bar arranged in said housing and thereby in said one comminution zone and having an impact surface cooperating with said one hammer bar so that the latter oscillates toward said impact surface of said anvil bar; a fixed abutment arranged in said housing and thereby in said one comminution zone; and a spring element arranged in said housing and thereby in said one comminution zone so as to rest on said fixed abutment and oscillatably mount said hammer bar, said hammer bar, anvil bar, spring element, abutment and housing together forming at least one block which is mounted exchangeable as a whole in said one oscillatable container.

2. An oscillatory mill as defined in claim 1, wherein said container has a plurality of comminution zones spaced from one another in a vertical direction, said housing extending in the vertical direction over said plurality of comminution zones; and further comprising a plurality of groups each including at least one such hammer bar, anvil bar, spring element and abutment and arranged in said housing in a respective one of said comminution zones, said exchangeable block including said housing with said plurality of groups of hammer bars, anvil bars, spring elements and abutments.

3. An oscillatory mill as defined in claim 2, wherein the hammer bars and the anvil bars of each comminution zone has impact surfaces; and further comprising a plurality of such abutments each formed as a sheet metal member passing through a respective one of said comminution zones parallel to said impact surfaces.

4. An oscillatory mill as defined in claim 1, wherein said hammer bar oscillates in a horizontal direction; and further comprising a plurality of rows of such hammer bars and a plurality of rows of such anvil bars spaced from one another in the horizontal direction and arranged in said housing, said exchangeable block including said housing with said plurality of rows of said hammer bars and anvil bars.

5. An oscillatory mill as defined in claim 4, wherein each of said rows of hammer bars includes a plurality of hammer bars located one behind the other, as considered in a further horizontal direction transverse to said first mentioned horizontal direction.

6. An oscillatory mill as defined in claim 1; and further comprising a plurality of such blocks each mounted exchangeable as a whole in said one container, and means for clamping each of said blocks in the latter, said clamping means including releasable and adjustable thrust bearings.

7. An oscillatory mill as defined in claim 6, wherein each of said blocks has a plurality of outwardly projecting strips which are arranged one above the other and at opposite sides of said exchangeable block, said thrust bearings abutting against said pressure strips.

8. An oscillatory mill as defined in claim 7, wherein said thrust bearings are arranged to abut against said pressure strips of each of said blocks in a positively connecting manner.

9. An oscillatory mill as defined in claim 7, wherein said thrust bearings are arranged to abut against said pressure strips of each of said blocks in a force transmitting manner.

10. An oscillatory mill as defined in claim 1; and further comprising means for feeding a material to be ground, into said exchangeable block from said above, and means for discharging the ground material from said replaceable block from below.

11. An oscillatory mill as defined in claim 10, wherein said container has a top part in which said feeding means is arranged, and a bottom part in which said discharging means is arranged.

12. An oscillatory mill as defined in claim 1; and further comprising at least one directional exciter, and a plurality of such exchangeable blocks arranged parallel to one another and in such a manner that the same number of exchangeable blocks are located at each side of said directional exciter.

13. An oscillatory mill as defined in claim 1, wherein said housing of said replaceable block has a plurality of walls which are braced against one another in a dust-tight manner; and further comprising means for bracing said walls against one another and including tie rods.

14. An oscillatory mill as defined in claim 1, wherein said hammer bar oscillates in a predetermined direction, said housing of said exchangeable block having side walls including a plurality of wall portions which are retained in one another in a positively connected manner; and further comprising means for retaining said wall portions.

15. An oscillatory mill as defined in claim 14, wherein said retaining means includes tie rods arranged to retain said wall portions of said side walls of said housing by tensile force of said tie rods.

16. An oscillatory mill as defined in claim 14, wherein said retaining means includes thrust bearings arranged to retain said wall portions of said side walls of said housing by compressive stress of said thrust bearings.

17. An oscillatory mill as defined in claim 14, wherein said wall portions are elongated and formed as vertical elements each having a wide end and a narrow end and engaging one another in a positively connected manner at their narrow ends facing toward one another.

18. An oscillatory mill as defined in claim 17, wherein said elongated elements are formed as strips.

19. An oscillatory mill as defined in claim 17, wherein said elongated elements are formed as rods.

20. An oscillatory mill as defined in claim 17; and further comprising means for positively connecting said elongated elements at their narrow ends and including a groove formed at the narrow end of one of said elongated elements and a tongue formed at the narrow end of a neighboring elongated element and engaging in said groove.

21. An oscillatory mill as defined in claim 20, wherein each of said abutments is elongated and has an upper portion which is roof-shaped and extends over the entire length of said abutment, and two side portions which are bent downwardly and extend substantially parallel to said upper portion.

22. An oscillatory mill as defined in claim 14, wherein said container has a plurality of comminution zones spaced from one another in a vertical direction, said housing extending in the vertical direction over said plurality of comminuting zones; and further comprising a plurality of vertically spaced groups each including at least one such hammer bar, anvil bar, spring element and abutment arranged in said housing in a respective one of said comminution zones, so that said exchangeable block includes said housing and said plurality of groups of said hammer bars, anvil bars, spring elements and abutments, the anvil bars located in the same vertical plane being firmly but releasably connected to a respective one of said wall portions of said side walls of said housing.

23. An oscillatory mill as defined in claim 14; and further comprising means for compensating play between said wall portions in dust-tight manner, said compensating means including at least one strip arranged between two neighboring wall portions of said side walls of said housing.

24. An oscillatory mill as defined in claim 23, wherein said compensating means includes a plurality of such compensating strips, at least one of said strips being arranged to compensate play in the direction of oscillation of said hammer bar and has the same thickness over the entire height of said replaceable block.

25. An oscillatory mill as defined in claim 23, wherein said compensating means includes a plurality of such strips having at least one strip of a different thickness.

26. An oscillatory mill as defined in claim 1; and further comprising a sound-proofing means enclosing said housing with said exchangeable block, said sound-proofing means having door means which are openable so as to allow removal of said replaceable block in a lateral direction.

27. An oscillatory mill as defined in claim 1, wherein said spring element has a body portion of a resilient polymeric material, and at least one metal coil spring embedded in said body portion.

28. An oscillatory mill as defined in claim 27, wherein said body portion of said spring element is constituted of rubber.

29. An oscillatory mill as defined in claim 27, wherein said body portion of said spring element is constituted of a synthetic material.

30. An oscillatory mill as defined in claim 27, wherein said body portion of said spring element has two end regions and a central longitudinal point therebetween, said body portion having a cross section which constantly decreases from said end regions toward said central point.

31. An oscillatory mill as defined in claim 27, wherein said metal coil has a central region and is provided with a bolt extending through said coil spring in said central region, said bolt having one end releasably connected with said abutment, and the other end releasably connected to said hammer bar.

32. An oscillatory mill as defined in claim 1, wherein said hammer bar has a lower side and is supported only by said spring element at said lower side.

33. An oscillatory mill as defined in claim 32, wherein said spring element includes two spring members supporting said hammer bar at said lower side of the latter.

* * * * *